Patented Sept. 7, 1948

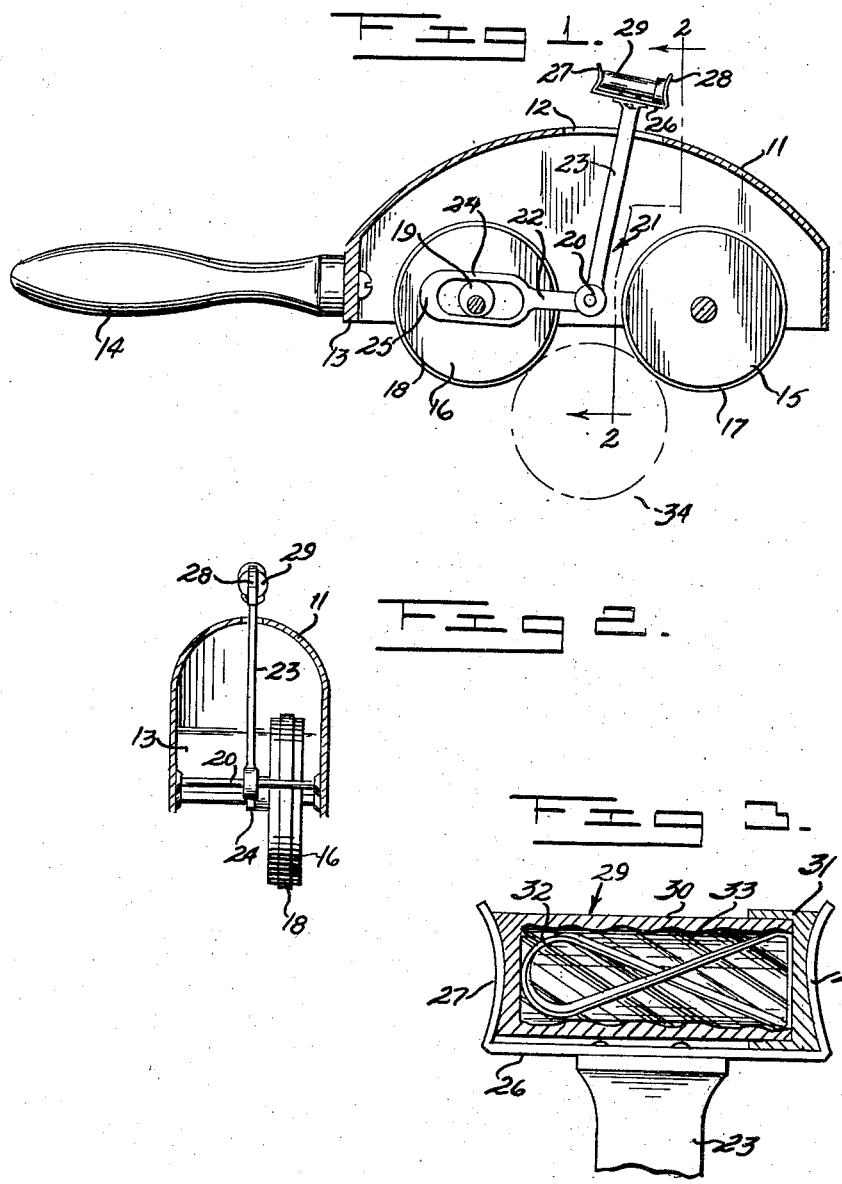

2,448,840

UNITED STATES PATENT OFFICE 2,448,840

DENTAL AMALGAMATOR

Byron Stewart, Columbus, Ohio

Application February 21, 1947, Serial No. 730,135

3 Claims. (Cl. 259—75)

This invention relates to mixing devices, and more particularly to a device for mixing amalgams and the like for use by dentists and dental technicians.

A main object of the invention is to provide a novel and improved dental amalgamator which may be driven from a conventional dental lathe chuck, said amalgamator being very simple in structure, easy to use and efficient in operation.

A further object of the invention is to provide an improved dental amalgamator which may be employed during a dental operation without complicated connections to the power supply available and without excessively loading the power supply said amalgamator being very inexpensive to manufacture and involving only a few simple parts.

Further objects and advantages of the invention will become apparent from the following description and claims, and from the accompanying drawings, in which:

Figure 1 is a vertical longitudinal view of a dental amalgamator constructed in accordance with the present invention.

Figure 2 is a cross-sectional view taken on line 2—2 of Figure 1.

Figure 3 is an enlarged longitudinal cross-sectional detail view taken through a mixing capsule employed with the amalgamator of Figure 1.

Referring to the drawings, 11 designates a housing of light rigid material such an aluminum, plastic, or the like, said housing being open at its bottom and being formed in its top wall with a longitudinal slot 12. One end wall of the housing is thickened, as shown at 13, and secured thereto is a handle 14. Journaled in the side walls of housing 11 is a front roller 15 and a rear roller 16, said rollers having rubber or other resilient friction material secured to their peripheral surfaces, as shown respectively at 17 and 18. The shaft of rear roller 16 carries an eccentric 19.

Pivoted to the side walls of housing 11 by a transverse shaft 20 is a bent lever 21 comprising a substantially horizontal arm 22 and an upwardly projecting arm 23 which passes through slot 12. Arm 22 carries an elongated apertured element 24 which engages eccentric 19 and which carries a counterweight portion 25 at its outer end. Secured to the top end of arm 23 is a U-shaped spring clip 26 having inwardly bowed spring gripping fingers 27 and 28. Frictionally secured between the fingers 27 and 28 is a capsule 29, said capsule having concave end surfaces receiving the inwardly bowed gripping fingers 27 and 28.

Capsule 29 comprises an elongated hollow body portion 30 and an end closure cap 31 fitting thereover. Cap 31 has secured thereto a looped vane element 32 of rigid strip material twisted to define a "figure 8," the end loop of the vane being disposed adjacent to the closed end wall of body portion 30 when the cap 31 is in closing position on said body portion, as shown in Figure 3. The inside wall surface of the body portion 30 is rifled to define smoothly curved helical corrugations 33.

The rollers 15 and 16 project a substantial distance below the bottom edge of housing 11 and are spaced so that they may be simultaneously engaged wtih the chuck 34 of a conventional dental lathe. The bearing for pivot 20 is located in the lower portion of the housing and is centered between the shafts of the rollers 15 and 16 so that it is in vertical alignment with the axis of chuck 34. This provides maximum swing for the capsule 29 and satisfactory balance for the moving parts of the amalgamator. The top wall of housing 11 preferably is curved to define an arc parallel to the arc defined by the swinging movement of the capsule. The slot 12 is preferably centered in said top wall.

In operation, the material to be amalgamated or mixed is placed in the capsule 29 and said capsule is inserted between the gripping fingers 27 and 28 in the manner shown in Figure 3. The rollers 15 and 16 are then applied to the rotating chuck 34, as shown in Figure 1. Rotation of eccentric 19 vibrates arm 22 and causes arm 23 to rock, imparting a reciprocating endwise motion to capsule 29. The material in the capsule is given a rotary motion by the rifling 33 and is agitated by contact with rigid vane member 32. This causes the material to be thoroughly mixed and kneaded. The twisted shape of the vane member 32 greatly accentuates the kneading action, which is very important in the amalgamation of dental alloys such as silver alloys.

Rollers 15 and 16 may be located closer together than as shown in Figure 1 when the driving chuck or shaft is of smaller diameter than chuck 34. This will in no way interfere with the application of the device to larger shafts or chucks.

Amalgamation can be effected by using a plain capsule having smooth inner wall surfaces, but superior results are obtained by employing the rifled capsule either alone or in combination with the rigid agitating vane 32.

The instrument can also be made to fit directly to the shaft of the dental lathe by connecting the eccentric shaft to the lathe shaft using a metal friction cap or other suitable resilient coupling. This method of employment would eliminate the need for the idler roller 15 but would require the removal of the chuck from the lathe each time the amalgamator was used.

While a specific embodiment of a dental amalgamator has been disclosed in the foregoing description, it will be understood that various modifications within the spirit of the invention may occur to those skilled in the art. Therefore, it is intended that no limitations be placed on the invention other than as defined by the scope of the appended claims.

What is claimed is:

1. A dental amalgamator device of the class described which may be power-driven from a conventional dental lathe chuck comprising, a housing having an open bottom side and provided with a longitudinal slot in its upper wall, a handle extending from the rear end wall of said housing, a forward shaft having its opposite ends journaled in said side walls, a front roller on said shaft, a rear shaft having its opposite ends journaled in said side walls and disposed in parallelism with said forward shaft and in substantially the same horizontal plane therewith, said rear shaft being provided with an eccentric, a rear roller on said rear shaft, an intermediate shaft journaled in said side walls and disposed between said forward and rear shafts in parallelism therewith, a bent lever pivoted on said intermediate shaft including a substantially horizontal rearwardly-extending arm and a relatively vertical arm projecting upwardly through said slot in said housing, said horizontal arm being provided with means engaging said eccentric, a spring clip on the upper end of said projecting arm having gripping fingers, and a capsule frictionally gripped between said fingers, all adapted and arranged whereby the device may be manipulated so as to bring the front and rear rollers into engagement with the conventional lathe chuck so as to bring about rotation of the eccentric and rocking of the upwardly projecting arm and consequent reciprocating motion to the capsule.

2. A dental amalgamator device of the class described which may be power-driven from a conventional dental lathe chuck comprising, a housing having an open bottom side and provided with a longitudinal slot in its upper side, a handle extending from the rear end wall of said housing, forward and rear shafts having their opposite ends journaled in said side walls, said shafts being disposed in parallelism with one another and in substantially the same horizontal plane, front and rear rollers on said forward and rear shafts respectively, said rear shaft being provided with an eccentric, an intermediate shaft journaled in said side walls and disposed between said forward and rear shafts in parallelism therewith, a bent lever pivoted on said intermediate shaft including a substantially horizontal rearwardly-extending arm and a relatively vertical arm projecting upwardly through said slot in said housing, means on the rear end of said horizontal arm engaging said eccentric, a U-shaped spring clip on the upper end of said projecting arm having a pair of spaced inwardly-bowed spring-gripping fingers, a capsule frictionally gripped between said fingers, said capsule including a hollow body portion having a closed end and an open end, the closed end of said capsule being engaged by one of said gripping fingers, a cap member closing said open end of the capsule and engaged by the other of said gripping fingers, and a looped vane member of relatively rigid strip material secured to said cap member and extending into said body portion of the capsule, all adapted and arranged whereby the device may be manipulated so that the front and rear rollers may engage a conventional dental lathe chuck and thereby bring about rotation of the eccentric and rocking of the upwardly projecting arm whereupon reciprocating motion is imparted to the capsule.

3. A dental amalgamator device of the class described which may be power-driven from a conventional dental lathe chuck comprising, a housing having an open bottom side and provided with a longitudinal slot in its upper side, a handle extending from the rear end wall of said housing, forward and rear shafts having their opposite ends journaled in said side walls, said shafts being disposed in parallelism with one another and in substantially the same horizontal plane, front and rear rollers on said forward and rear shafts respectively, said rear shaft being provided with an eccentric, an intermediate shaft journaled in said side walls and disposed between said forward and rear shafts in parallelism therewith, a bent lever pivoted on said intermediate shaft including a substantially horizontal rearwardly-extending arm and a relatively vertical arm projecting upwardly through said slot in said housing, means on the rear end of said horizontal arm engaging said eccentric, a U-shaped spring clip on the upper end of said projecting arm having a pair of inwardly-bowed spring-gripping fingers, a capsule frictionally gripped between said fingers, said capsule including a hollow body portion having a closed end and an open end, the inside wall surface of said body portion of the capsule being rifled so as to have helical corrugations and the closed end of said capsule being engaged by one of said gripping fingers, a cap member closing said open end of the capsule and engaged by the other of said gripping fingers, and a looped vane member of relatively rigid strip material secured to said cap member and extending into said body portion of the capsule, all adapted and arranged whereby the device may be manipulated so that the front and rear rollers may engage a conventional dental lathe chuck and thereby bring about rotation of the eccentric and rocking of the upwardly projecting arm whereupon reciprocating motion is imparted to the capsule so that material within the capsule is mixed and kneaded through contact therewith the rifling and the vane member of the capsule.

BYRON STEWART.

REFERENCES CITED

The following references are of record in the file of this patent:

UNITED STATES PATENTS

| Number | Name | Date |
|---|---|---|
| 715,301 | Schodron | Dec. 9, 1902 |
| 1,356,731 | Muchow | Oct. 26, 1920 |
| 1,363,275 | Sargent | Dec. 28, 1920 |
| 1,377,680 | Haight | May 10, 1921 |
| 1,578,067 | Bonoff | Mar. 23, 1926 |
| 1,686,135 | Hurdle | Oct. 2, 1928 |